Jan. 20, 1959   W. O. BENNING   2,869,890
RUNNING GEAR FOR HOUSES AND THE LIKE
Filed Feb. 29, 1956   2 Sheets-Sheet 1
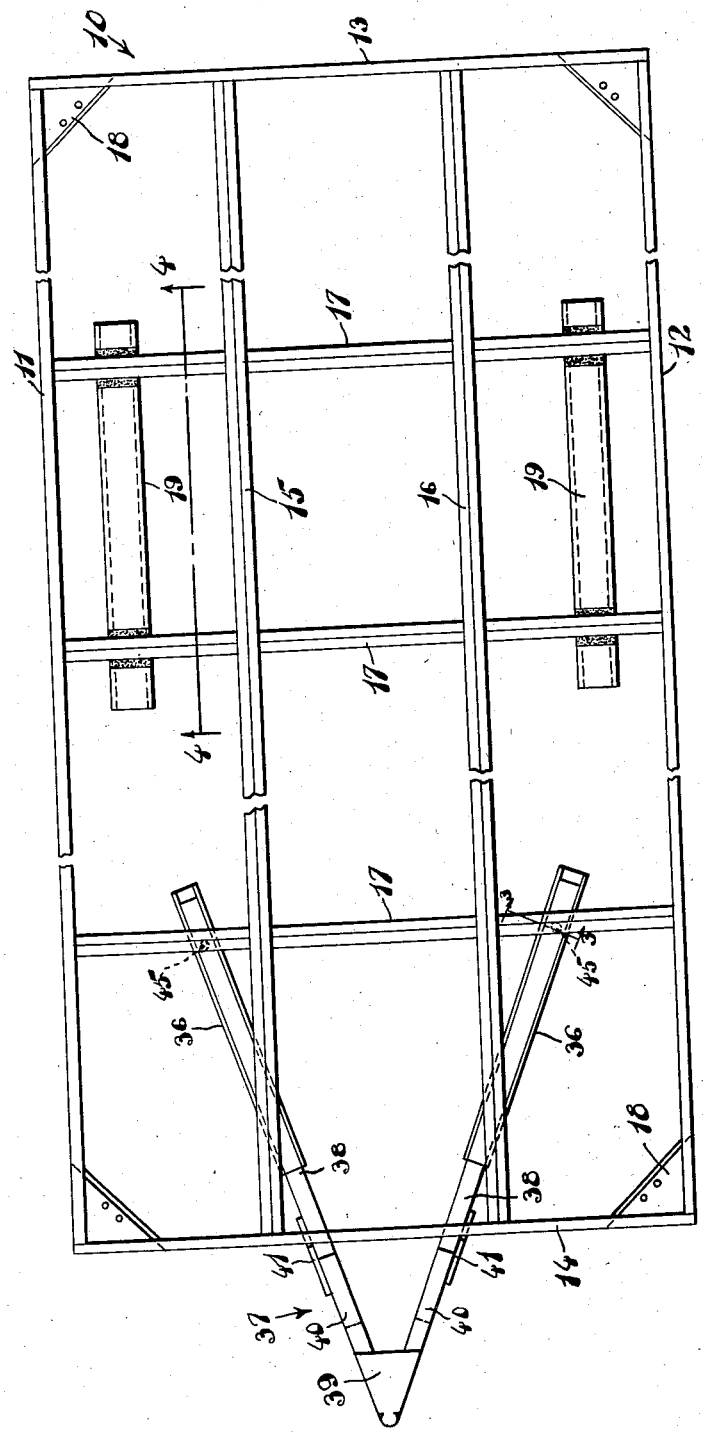
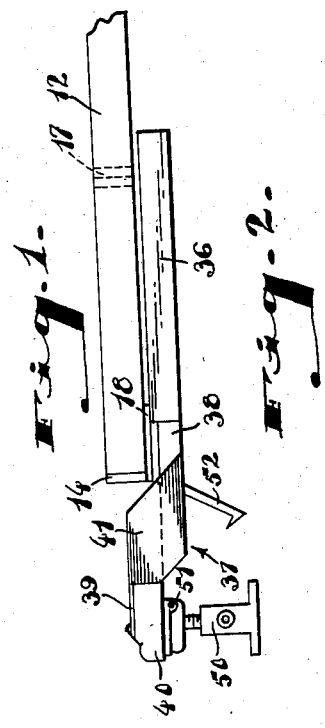
INVENTOR.
WILBERT O. BENNING
BY: Harold B. Hood,
ATTORNEY Jan. 20, 1959 W. O. BENNING 2,869,890
RUNNING GEAR FOR HOUSES AND THE LIKE
Filed Feb. 29, 1956 2 Sheets-Sheet 2

INVENTOR.
WILBERT O. BENNING
BY: Harold B. Hood
ATTORNEY

United States Patent Office 2,869,890
Patented Jan. 20, 1959

2,869,890

RUNNING GEAR FOR HOUSES AND THE LIKE

Wilbert O. Benning, South Whitley, Ind.

Application February 29, 1956, Serial No. 568,503

6 Claims. (Cl. 280—106.5)

The present invention relates to a means and mechanism for facilitating the transportation of relatively large, heavy units from, for instance, a point of assembly to, for instance, a site for relatively permanent installation. The invention has been conceived for use primarily in transporting prefabricated housing structure, and therefore will be described in that environment, though it will be appreciated that the invention may be applicable to the transportation of other units of radically different character. Broadly stated, the invention pertains to means whereby running gear of novel characteristics, and a tow bar of novel characteristics, may be readily and removably secured in cooperative association with a pre-formed frame upon which a superstructure may or may not have been erected.

The primary object of the invention, then, is to provide means whereby running gear may be readily, removably secured in supporting relation to a prefabricated frame; and, in at least some instances, to provide a tow bar of particular characteristics and means whereby such tow bar may be readily, removably secured likewise to the lower surface of such a frame, in supporting relation thereto.

A further object of the invention is to provide such means in the form of elements integrated with the frame and designed and arranged for cooperative reception of carrier members with which the other elements of a running gear unit are semi-permanently associated.

A further object of the invention is to provide similar means, integrated with such a frame, for the reception of permanent elements of a tow bar.

Another object of the invention is to provide means which may be built into each unit of a standard production item, for thus removably receiving a running gear assembly and, if desired, a tow bar, the whole system being so constructed and designed that a running gear assembly and a tow bar may be readily assembled with one frame to facilitate the transportation of that frame to an installation site, may there be removed from that frame, and may subsequently be similarly assembled with another frame, the same running gear assembly and tow bar being used successively for the transportation of a multiplicity of such similar frames.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a plan view of a frame having associated therewith means for removably attaching such a running gear assembly and such a tow bar, the tow bar being shown installed;

Fig. 2 is a fragmentary side elevation of the lefthand end portion of the frame of Fig. 1, and the tow bar;

Figures 3, 6:
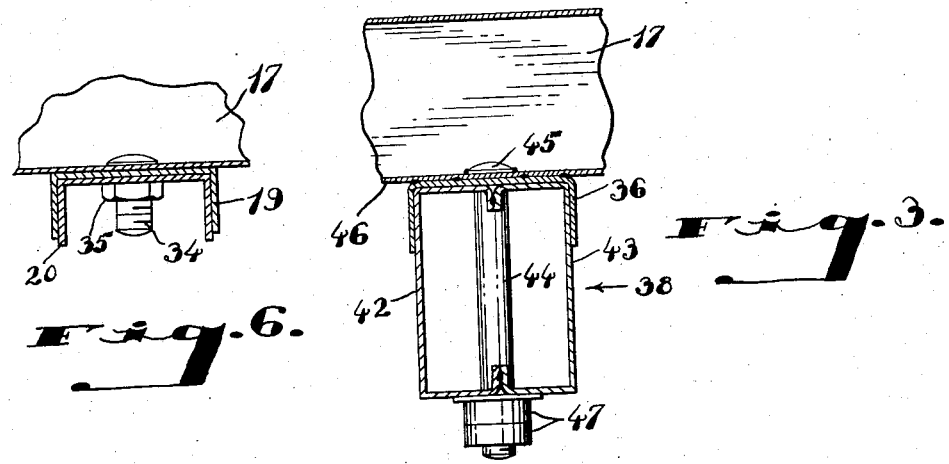
Fig. 3 is a sectional view, taken substantially on the line 3—3 of Fig. 1, and drawn to an enlarged scale.
Fig. 6 is a transverse sectional view, taken substantially on the line 6—6 of Fig. 4, and drawn to an enlarged scale.
Figure 4:
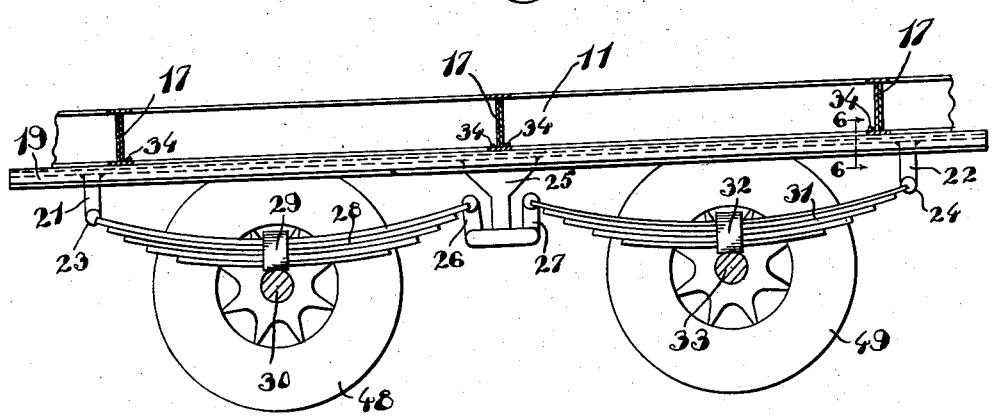
Fig. 4 is a sectional view, taken substantially on the line 4—4 of Fig. 1, and drawn to an enlarged scale.

Referring more particularly to the drawings, it will be seen that I have illustrated a frame, indicated generally by the reference numeral 10, and comprising side members 11 and 12 and end members 13 and 14 suitably braced by longitudinal stringers 15 and 16 and transverse members 17. For reasons pointed out in my copending application Serial No. 568,504, filed February 29, 1956, for Factory Assembled Housing and Installation Thereof, the members 11, 12, 13 and 14 are preferably channel beams arranged to open outwardly, while the members 15, 16 and 17 are preferably box beams which may be produced by welding together members of C cross-section with their terminal flanges in abutting relationship, as suggested in Fig. 3. The particular characteristics of the frame elements, however, form no part of the present invention, in which frame elements of any characteristics could be used.

Figure 5:
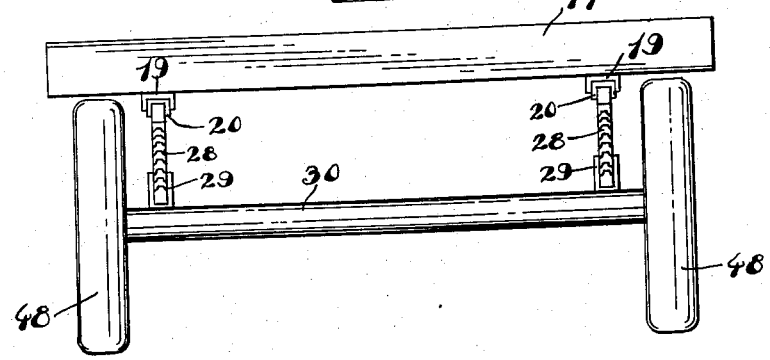
Fig. 5 is an elevation taken from the righthand end of Fig. 1, and showing the running gear assembly in place.

Two downwardly-opening channels 19, 19 are permanently secured to the lower surface of the frame 10 at a suitable location preferably nearer to one end of the frame than to the other end thereof, said channels 19, 19 preferably being equally and oppositely spaced from the median longitudinal plane of the frame. For each of the channels 19, 19, I provide a carrier member 20 of any suitable cross section shaped and proportioned to fit snugly in one of the channels 19. Preferably, each of the carrier elements 20 will, itself, be a downwardly-opening channel, as illustrated in Figs. 5 and 6. To the web of each channel 20 is permanently affixed, as by welding, suspension means for mounting suitable spring means to which is suitably secured wheel means for supporting the spring means. As shown, I prefer to provide a depending post 21 adjacent one end of each carrier element and a similar depending post 22 near the opposite end thereof, the post 21 being provided with shackle means 23 and the post 22 being provided with shackle means 24. According to the preferred embodiment, a depending bracket 25 is permanently secured to the web of each carrier element 20 adjacent the mid-point thereof, each such bracket carrying shackle means 26 and separate shackle means 27. A multiple leaf spring 28 has one end attached to the shackle means 23 and its opposite end attached to the shackle means 26; and substantially at its mid-point, the spring 28 is supported in a bracket 29 suitably secured to an axle 30 carrying a wheel 48. As shown, the axle 30 extends between the two wheels 48, with one bracket 29 mounted adjacent each end of the axle; but it will be obvious that the two wheels 48 might be independently sprung, without any connection therebetween. Since spring suspension means of various characteristics are well known in the art of wheeled vehicles, I have chosen a simplified and somewhat diagrammatic illustration of the means whereby the carrier elements 20 may be spring-suspended from the wheels.

In the illustrated embodiment of the invention, a second multiple leaf spring 31 has one end secured to the shackle means 24 and its other end secured to the shackle means 27, the mid-point of the spring being supported in bracket means 32 carried upon axle means 33 supported by a wheel or wheels 49. It will be obvious, of course, that a single wheel could be used with each carrier, that more than two wheels could be used with each carrier, and that more than one carrier could be assembled with each channel 19, without departing from the spirit of the present invention.

Any suitable means may be used for removably securing the carriers 20 in place in the channels 19; and in Fig. 6 I have suggested one such means, comprising bolts 34 passing through the flanges of cross beams 17 with their shanks penetrating the webs of the channels 19 and projectible through suitable openings in the webs of the carriers 20 when such carriers are assembled with the channels 19, the shanks of said bolts being adapted to receive one or more nuts 35 for securing the carriers in place.

It will be obvious from the above that a running gear assembly, comprising one or more pairs of wheels supporting springs which, in turn, are shackled to carrier elements, may be readily assembled with the channels 19 on the lower surface of a prefabricated frame 10 which may or may not, at that time, carry any sort of superstructure. At the time of such assembly, of course, the frame 10 will be suitably supported at a level such that the connection of the running gear assembly thereto may be accomplished without substantial flexure of the springs embodied in the running gear; and the frame may be lowered thereafter, as for instance, by suitable jacking mechanism, until its weight rests upon the running gear.

Near the opposite end of the frame 10, I mount a pair of downwardly opening channels 36, 36 upon the lower surface of the frame in any suitable manner, as by welding. The channels 36, 36 are substantially allochirally arranged relative to said longitudinal median plane of the frame, and inclined toward said plane as they approach the adjacent end of the frame, in the manner clearly illustrated in Fig. 1. A generally V-shaped tow bar, indicated generally by the reference numeral 37, comprises a pair of beams or legs 38, 38 joined at their adjacent ends as, for instance, by a plate 39, and diverging therefrom at angles corresponding to the angular relation of the channels 36, 36. Each beam 38 is preferably formed, as shown in Fig. 3, from two elements 42, 43 of C-shaped cross section, their terminal flanges being joined by welding, for instance; and the beams 38 are proportioned and designed to fit snugly in the respective channels 36, 36.

Preferably, each leg 38 includes a section 40 which is offset upwardly from the general plane of said beams so that, when the legs or beams 38 are received in the channels 36, the sections 40 will lie substantially in the plane of the frame 10. Preferably, the sections 40 are joined to the beams 38 by plates 41, 41, suitably secured, as for instance by welding, to the legs 38 and the sections 40, in the manner most clearly illustrated in Fig. 2.

The legs 38 are removably secured in the channels 36 by any readily-manipulable means such as, for instance, bolts 44. As shown, and preferably, said bolts will have their heads 45 located within the cross beams 17 and the stringers 15 and 16, and desirably, the bolt heads may be welded in place in the frame members, as suggested in Fig. 3. The shanks of said bolts will project downwardly to pass through suitable apertures in the legs or beams 38, for the reception of one or more nuts 47 for securing the legs 38 removably in place in said channels.

Preferably, a mechanical jack 50 will be hingedly secured, at 51, to the forward end of a tow bar for supporting the forward end of the frame, at times; means such as the spring clip 52 being provided for holding the jack in inoperative position when the forward end of the tow bar is supported on a towing vehicle.

It will be perceived that, with the tow bar and running gear in place, the frame 10 and any superstructure thereon, may be transported easily to a point of installation. Upon arrival at such site, the frame may be raised, on suitable jacks, to remove its weight from the tow bar and the running gear. Thereupon, the tow bar and the running gear may be readily removed, after which the frame may be lowered onto a previously-prepared foundation; and the tow bar and running gear will be available for association with another frame for transportation. The arrangement of the channels 19 and 36 is such that, after the frame has been installed, their presence will not be apparent.

I claim as my invention:

1. In combination, a base frame for a structure comprising boundary elements and bracing elements spanning certain of said boundary elements, a pair of downwardly-opening channel members secured to the lower surface of said frame near one end thereof, said channel members being substantially parallel with and substantially equally and oppositely spaced from the median longitudinal plane of said frame, a pair of wheels, suspension means for each of said wheels, each suspension means including an element snugly receivable in one of said channel members, means for removably securing each of said elements in its respective channel member, a further pair of downwardly-opening channel members secured to the lower surface of said frame near the other end thereof, said further channel members being substantially allochirally arranged relative to said median plane and inclining toward said plane as they approach said last-named frame end, a generally V-shaped tow bar having diverging legs, each of said legs having a portion snugly receivable in one of said further channels, and means for removably securing each of said legs in its respective channel member.

2. The combination of claim 1 in which that portion of said tow bar near the junction of said legs is disposed outside the boundary of said frame when said first-named leg portions are so secured in said channel members, said last-named tow bar portion being disposed at a level above that of said first-named leg portions.

3. The combination of claim 2 in which the level of said last-named tow bar portion substantially coincides with the level of said frame when said first-named leg portions are so secured.

4. In combination, a base frame for a structure comprising longitudinally extending side rails and transversely extending bracing elements connecting said side rails, a pair of downwardly-opening channel members secured to the lower surface of certain of said transverse bracing elements, each such channel member comprising a horizontal web and a pair of depending, substantially vertical legs, said channel members being substantially parallel with and substantially equally and oppositely spaced from the median longitudinal plane of said frame, whereby said channel member legs extend longitudinally of said frame, a carrier element snugly received in each of said channels and restrained, by engagement with the legs of its associated channel, against lateral movement relative to its channel member, spring suspension means for each of said carrier elements, spring means operatively connected to each suspension means, wheel means for supporting each spring means, and means removably securing each carrier element in its respective channel member.

5. In combination, a base frame for a structure comprising longitudinally extending side rails and transversely extending bracing elements connecting said side rails, a pair of downwardly-opening channel members secured to the lower surface of certain of said transverse bracing elements, each such channel member comprising a horizontal web and a pair of depending, substantially vertical legs, said channel members being substantially parallel with and substantially equally and oppositely spaced from the median longitudinal plane of said frame, whereby said channel member legs extend longitudinally of said frame, a carrier element snugly received in each of said channels and restrained, by engagement with the legs of its associated channel, against lateral movement relative to its channel member, a depending post near each end of each carrier element, a depending bracket near the middle of each carrier element, shackle means carried by each bracket, a multiple-leaf spring for each carrier element having one end secured to one of said posts of its carrier and its other end secured to shackle means carried by the bracket of its carrier, a wheel having an axle operatively connected to each of said springs intermediate said ends thereof, a second multiple-leaf spring for each carrier element having one end secured to the other of said posts of its carrier and its other end secured to shackle means carried by the bracket of its carrier, a second wheel having an axle operatively connected to each of said second springs intermediate said ends thereof, and means removably securing each of said carrier elements in its respective channel member.

6. In combination, a base frame for a structure comprising boundary elements and bracing elements spanning certain of said boundary elements, a pair of downwardly-opening channel members secured to the lower surface of said frame near one end thereof, said channel members being substantially parallel with and substantially equally and oppositely spaced from the median longitudinal plane of said frame, a carrier element snugly receivable in each of said channels, spring suspension means for each of said carrier elements, spring means operatively connected to each suspension means, wheel means for supporting each spring means, means for removably securing each carrier element in its respective channel member, a further pair of downwardly-opening channel members secured to the lower surface of said frame near the other end thereof, said further channel members being substantially allochirally arranged relative to said median plane and inclining toward said plane as they approach said last-named frame end, a generally V-shaped tow bar having diverging legs, each of said legs having a portion snugly receivable in one of said further channels, and means for removably securing each of said legs in its respective channel member.

References Cited in the file of this patent
UNITED STATES PATENTS

| | | |
|---|---|---|
| 2,248,080 | Hathaway | July 8, 1941 |
| 2,268,167 | Raine | Dec. 30, 1941 |
| 2,606,769 | De Lay | Aug. 12, 1952 |
| 2,682,419 | Wolf | June 29, 1954 |
| 2,729,470 | Seitz | Jan. 3, 1956 |
| 2,750,205 | Russell | June 12, 1956 |